United States Patent [19]

Boffito et al.

[11] 4,312,669

[45] Jan. 26, 1982

[54] NON-EVAPORABLE TERNARY GETTERING ALLOY AND METHOD OF USE FOR THE SORPTION OF WATER, WATER VAPOR AND OTHER GASES

[75] Inventors: Claudio Boffito; Aldo Barosi; Alessandro Figini, all of Milan, Italy

[73] Assignee: SAES Getters S.p.A., Milan, Italy

[21] Appl. No.: 115,051

[22] Filed: Jan. 24, 1980

[30] Foreign Application Priority Data

Feb. 5, 1979 [IT] Italy ............................. 19901 A/79

[51] Int. Cl.$^3$ ............................................. C22C 16/00
[52] U.S. Cl. ........................................ 75/177; 55/33; 376/418
[58] Field of Search ................. 75/177; 176/91 R, 68; 55/33

[56] References Cited

U.S. PATENT DOCUMENTS

| | | | |
|---|---|---|---|
| 2,926,981 | 3/1960 | Stout et al. | 75/177 |
| 4,065,352 | 12/1977 | Iwano et al. | 176/68 |
| 4,071,335 | 1/1978 | Barosi | 55/68 |
| 4,082,834 | 4/1978 | Grossman et al. | 176/68 |
| 4,119,488 | 10/1978 | Barosi | 176/68 |
| 4,124,659 | 11/1978 | Porta et al. | 264/0.5 |
| 4,163,666 | 8/1979 | Shaltiel et al. | 75/177 |
| 4,200,460 | 4/1980 | Grossman et al. | 75/177 |

OTHER PUBLICATIONS

Shaltiel et al., Jour. Less–Common Metals, 53 (1977) 117.

Primary Examiner—L. Dewayne Rutledge
Assistant Examiner—Upendra Roy
Attorney, Agent, or Firm—David R. Murphy

[57] ABSTRACT

A non-evaporable getter alloy is provided which can be used in a process for the sorption of gas from a closed vessel comprising the step of:
introducing into the vessel a non-evaporable ternary gettering alloy whose composition in weight percent when plotted on a ternary composition diagram in weight percent Zr, weight percent V and weight percent Fe lies with a polygon having as its corners the points defined by:
(a) 75% Zr-20% V-5% Fe
(b) 45% Zr-20% V-35% Fe
(c) 45% Zr-50% V-5% Fe such alloys can sorb water vapor without the release of $H_2$ between 200°–350° C. and can be used in a wide temperature range for the sorption of other gases. They can also be activated in short times at relatively low temperatures, to be used as a getter at room temperature.

8 Claims, 16 Drawing Figures

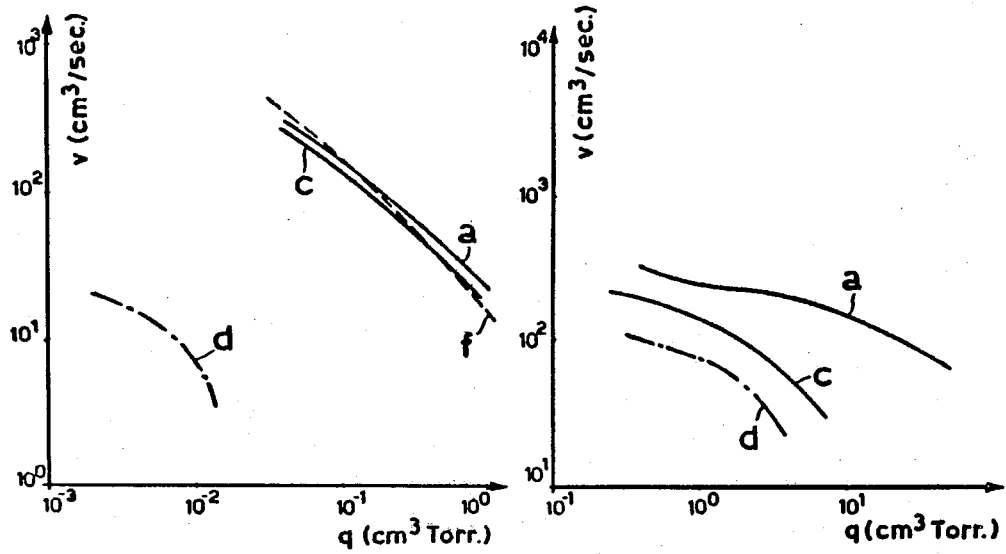
FIG. 12
FIG. 13
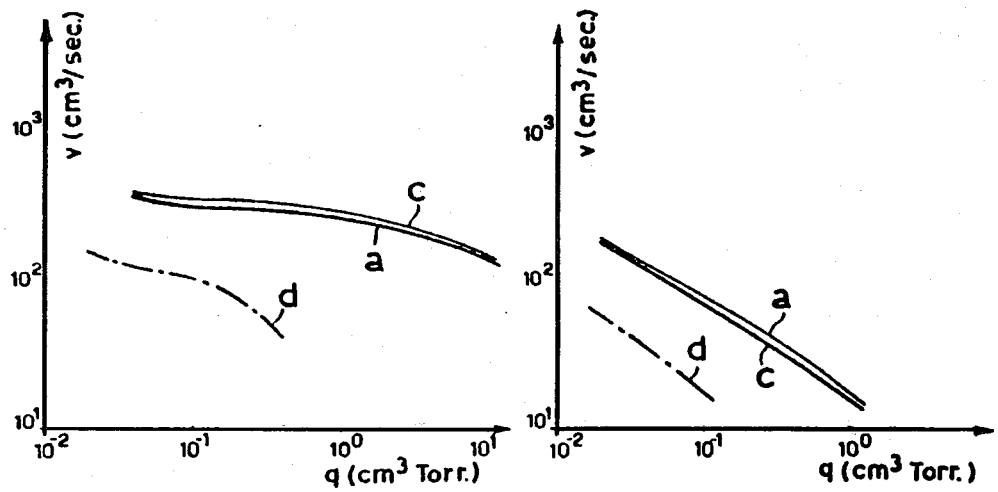
FIG. 14
FIG. 15

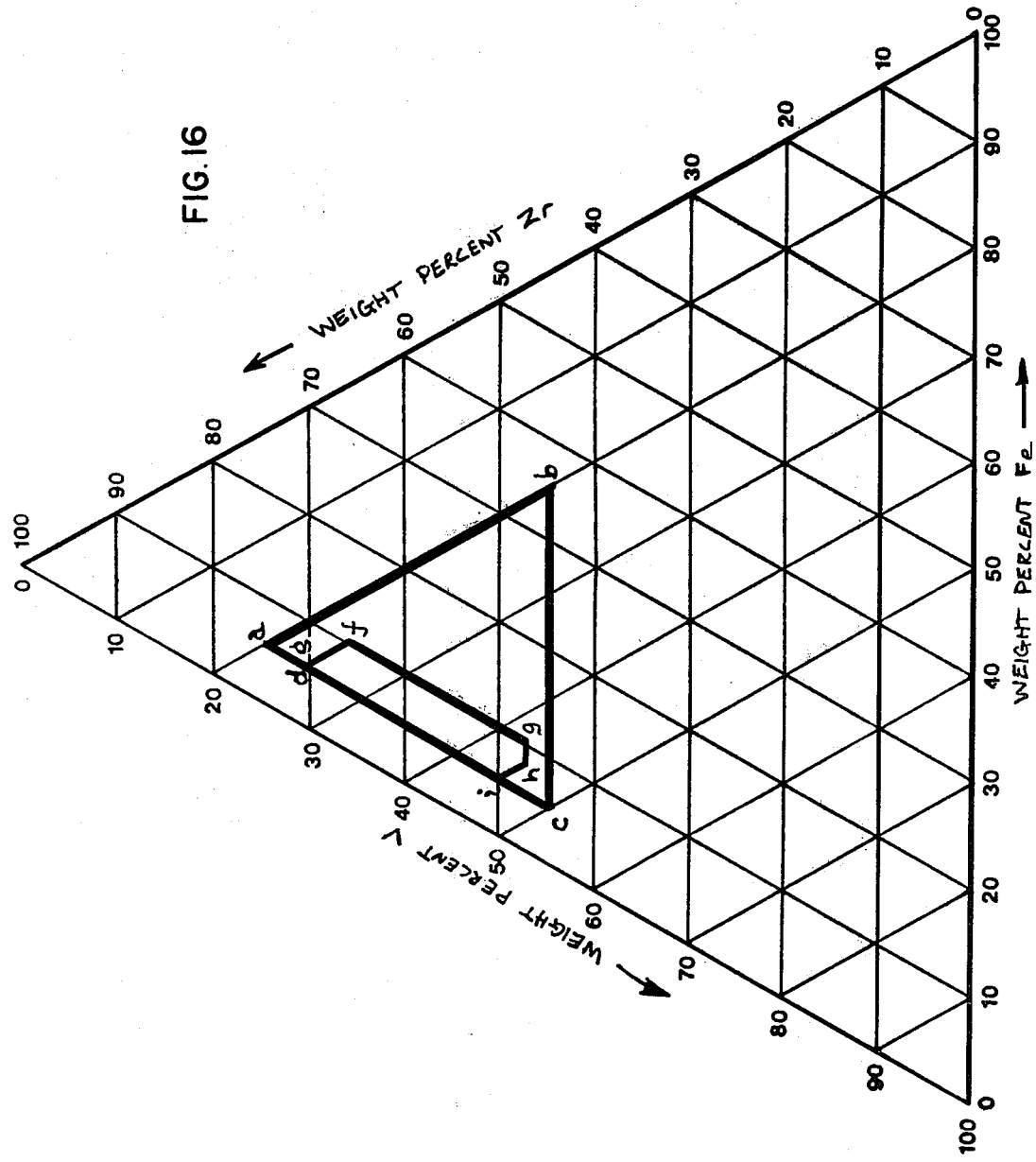

NON-EVAPORABLE TERNARY GETTERING ALLOY AND METHOD OF USE FOR THE SORPTION OF WATER, WATER VAPOR AND OTHER GASES

BACKGROUND OF THE INVENTION

The object of the present invention is a non-evaporable ternary gettering alloy and its method of use for the sorption of water, water vapour and other gases.

So called getters or sorbers are well known in the art and are described in numerous patents, such as for example in U.S. Pat. Nos. 3,203,901 and 4,071,335. In an article appearing in the journal "Electrochemical Technology" Vol. 4, n. 5-6, May/June 1966, pag. 211-215, A. Pebler and A. Gulbransen have also described the use of the intermetallic compound $ZrV_2$ for the sorption of hydrogen, but this material in the form of a powder is pyrophoric.

Ternary alloys of Zr, V and Fe have been described by D. Shattiel, I. Jacob and D. Davidov in J. Less-Common Metals 53 (1977) 117-131 for the reversible storage of hydrogen at atmospheric and higher pressures. Such alloys have the composition $Zr(Fe_xV_{1-x})_2$ where $0 \leq x \leq 1$.

Non-evaporable ternary gettering alloys have also been described for example in British Pat. No. 1,370,208 where there is specifically mentioned the alloy based on zirconium, Zr-Ti-Ni and its usefulness when it is wished to stoichiometrically sorb humidity or water vapour, as well as other gases, without the release of hydrogen.

The desire to have a gettering material capable of sorbing water without releasing hydrogen is particularly felt in the nuclear energy production industry, as the fuel rod sheathing most commonly used is a material based on zirconium, which in the presence of hydrogen and/or water is subject to cracking. Water is released mainly from the sintered fuel pellets, of a ceramic nature, usually $UO_2$, which are contained within the fuel element. Even though these fuel pellets are subjected to a heat treatment in order to remove water vapour, during their use in a nuclear reactor they still release water vapour.

The presence of water vapour is also undesirable in other cases, for example within the envelopes of incandescent filament lamps where the water vapour takes part in the well known "water cycle", due to which there is a continuous transfer of tungsten from the filament to the walls of the lamp with a subsequent blackening or darkening of the glass and premature erosion of the filament and therefore lamp destruction.

Also in high pressure discharge lamps it is necessary to maintain a low level of hydrogen and other gases within their jacket.

The known ternary alloy Zr-Ti-Ni, as known from the above mentioned British patent specification, must be used at a temperature of 350° C. or more, to ensure that during the sorption of water and water vapour there is no release of hydrogen. That temperature corresponds approximately to that at which the getter device finds itself when used for example in boiling water reactors or pressurized water reactors ("BWR" or "PWR" reactors). However during the starting phases of a new reactor and also when the reactor is working at low power, the temperature may be considerably lower than 350° C. Therefore during these periods of operation there is a danger of a harmful release of hydrogen.

It would therefore be very useful to have available a getter material able to sorb water and water vapour, without release of hydrogen, at temperatures less than 350° C.

Furthermore it would be useful to have a gettering material having a high sorption velocity able, therefore, to sorb as quickly as possible all the water and all the water vapour within the ambient in which the getter is used.

In other traditional getter device applications, for example in certain electron tubes, it is possible to activate the getter at a relatively high temperature, then using the getter at a pre-determined lower temperature for sorbing certain gases.

In particular there may be required a getter capable of working at ambient temperatures as it may not be possible to supply energy in order to make the getter work in a continuous way at higher temperatures, or the device may not be able to support these higher temperatures.

The activation of these getters takes place by means of a thermal treatment for a certain length of time. Normally this thermal treatment takes place at temperatures between 700° and 1000° C. for a time of several tens of seconds up to several minutes. The activation process apparently allows the surface passivated layers of the gettering material to diffuse into the individual particles of the material thus providing a clean surface capable of sorbing gas.

If, however, it is wished to activate the known getter at lower temperatures, the time necessary for this diffusion becomes prohibitively long, of the order of several hours. Nevertheless in some cases it is undesirable or even impossible to allow the getter device to reach temperatures of the order of 700° to 1000° C., for which reason it is difficult to activate the getter device.

OBJECTS OF THE INVENTION

An object of the present invention is therefore mainly that of providing a non-evaporable getter material and process which can be used in a wide variety of applications of which some of the main ones have been mentioned above, and which has at least equal and preferably improved properties with respect to those used up to the present moment in these various fields of application.

In particular one object of the invention is to provide a gettering alloy capable of sorbing stoichiometrically, at relatively low temperatures of less than 350° C., water and water vapour without release of hydrogen, as well as sorbing other gases, at high sorption speeds.

Another object of the invention is that of providing a gettering alloy and process for its use which in traditional uses at relatively low temperatures and even at room temperature, after an activation at high temperature, is more active than presently known gettering alloys.

A further object of the invention is that of providing a gettering alloy capable of being activated at relatively low temperatures, particularly at temperatures less than 700° C., in a relatively short time of the order of a few minutes, and which can be used at room temperature for the sorption of gas.

A further scope of the invention is that of providing getter alloy which can be easily handled in the form of a powder.

BRIEF DESCRIPTION OF THE DRAWINGS

FIGS. 9 through 15 inclusive are graphs showing the sorption speed, V, as a function of the quantity, q, of gas sorbed.

FIG. 16 is a ternary diagram showing the compositions of gettering alloys useful in the present invention.

DESCRIPTION OF THE INVENTION

Figure 1:
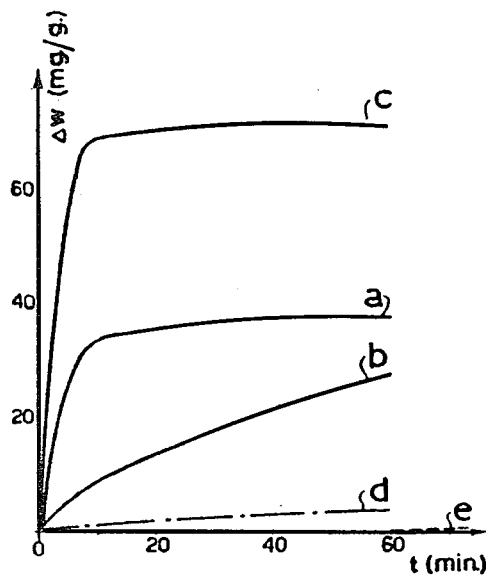
FIGS. 1 through 4 inclusive are graphs showing the sorption speed and capacity of the gettering alloy.

It has been surprisingly found, and constitutes therefore the main characteristic of the present invention, that the above mentioned objects are obtained with the use of the ternary alloy Zr-V-Fe whose composition in weight percent when plotted on a ternary composition diagram in weight percent Zr, weight percent V and weight percent Fe lies within a polygon having as its corners the points defined by:
 (a) 75% Zr - 20% V - 5% Fe
 (b) 45% Zr - 20% V - 35% Fe
 (c) 45% Zr - 50% V - 5% Fe It has been found in fact that these ternary alloys have particularly advantageous properties between 200° C. and 350° C. when they are used for the stoichiometric sorption of water and water vapour without the release of hydrogen. The same alloys can also be used in a wider temperature range as a getter for the sorption of other gases such as $H_2$, CO, $CO_2$, etc.

Furthermore, the alloys of the present invention can be activated in short times at relatively low temperatures, to be used as a getter at room temperature.

The weight ratio between the three components of the ternary alloy according to the invention can vary between wide limits.

However the choosing the proportions of the various components of the alloy it is preferable to observe several conditions.

In the first place the Zr content of the ternary alloy should be neither too high nor too low as otherwise the alloy, during sorption of water, will release hydrogen and furthermore could become too plastic creating difficulties in its transformation into a fine powder.

The vanadium content should also not be too low otherwise the ternary alloy will not have the desired property of sorption of gases.

The weight percentage of vanadium with respect to iron should preferably be from 75 to 85%.

Typical compositions of the ternary alloy according to the invention comprise:
 Zr from 45 to 75, and preferably from 47 to 70% by weight
 V from 20 to 50, and preferably from 24 to 45% by weight
 Fe from 5 to 35, and preferably from 5 to 10% by weight The compositions in weight percent when plotted on a ternary composition diagram in weight percent Zr, weight percent V and weight percent Fe lies within a polygon having as its corners the points defined by:
 (a) 75% Zr - 20% V - 5% Fe
 (b) 45% Zr - 20% V - 35% Fe
 (c) 45% Zr - 50% V - 5% Fe
 and preferably lies within the polygon having as its corners the points defined by:
 (d) 70% Zr - 25% V - 5% Fe
 (e) 70% Zr - 24% V - 6% Fe
 (f) 66% Zr - 24% V - 10% Fe
 (g) 47% Zr - 43% V - 10% Fe
 (h) 47% Zr - 45% V - 8% Fe
 (i) 50% Zr - 45% V - 5% Fe
See FIG. 16.

In particular experimental tests were performed on ternary alloys of Zr-V-Fe according to the invention having the following compositions (in weight percent):
 (a) Zr 47.2 - V 43.3 - Fe 9.5
 (b) Zr 60 - V 32.8 - Fe 7.2
 (c) Zr 70 - V 24.6 - Fe 5.4

These alloys can be prepared according to the teachings of Alessandro Figini as described in a co-pending patent application entitled "Method for the Production of Non-evaporable Ternary Gettering Alloys" executed on the same date as the instant application and bearing on the first page the docket number QMR 6649. For example alloy (b) above can be prepared by taking 30 grams of Zr sponge of commercial purity grade, obtained from Ugine-Kuhlman (France) where broken into small and mixed in air at atmospheric pressure and at room temperature with 20 grams of lumps of a V-Fe alloy containing (nominal) 82% V obtained from Murex, United Kingdom. The mixture was placed in a cold copper crucible vacuum furnace as described by A. Barosi in the paper entitled "Gettering Activities of some Single Phases Present in the Zr-Al Alloy System", Residual Gases in Electron Tubes, Ed. T. A. Giorgi and P. della Porta, Academic Press, 1972, p. 221-235. The vacuum furnace was evacuated to about $10^{-5}$ torr by means of a turbomolecular pump and the HF induction heating generator was switched on.

Within a few minutes a temperature of approximately 1250° C. was reached and the mixture became a molten mass. The generator was switched off and the alloy allowed to cool to room temperature. The alloy ingot was then broken into small lumps and remelted several times to ensure even and uniform alloy formation. It should be realized that in an industrial manufacturing process a single slightly prolonged heating stage would be used as being sufficient to ensure uniform alloy formation. The multiple heating steps in the present examples were performed only for reasons of scientific thoroughness. After the final cooling step the ingot was found to weigh 49.5 grams. Part of the ingot was ground in a ball mill, under argon, until the particle size was less than 125μ.

The ternary alloy according to the invention is used as a gettering material in the form of a finely divided powder preferably having a particle size between 1μ and 500μ and more preferably between 25μ and 125μ.

The alloy has an overall composition of: 60% Zr- 32.8% V-7.2% Fe.

The powder can be compressed into pellets which can be used either with or without a container, or it can be attached to a support as described in Italian Patent No. 746,551. As an alternative the powder can be applied by means of chemical binders and successively sintered.

In the following there will be described several examples of applications of the ternary alloy of the invention and, with reference to the attached drawings which illustrate properties of the gettering alloys, there will be described the advantages with respect to other known gettering materials.

In the first place reference is made to the use of the ternary gettering alloy as a getter destined for use for the sorption of water vapour without releasing hydrogen at working temperatures less than 350° C. This is typical of application in nuclear reactors.

The tests were performed with three Zr-V-Fe alloys of the invention indicated above with letters a, b and c, which alloys have been compared with the known ternary alloy Zr-Ti-Ni (see British Pat. No. 1,370,208) having a weight ratio between the components of 82:9:5, as well as with the known alloy $Zr_2Ni$ (see U.S. Pat. No. 4,071,335).

Figure 2:
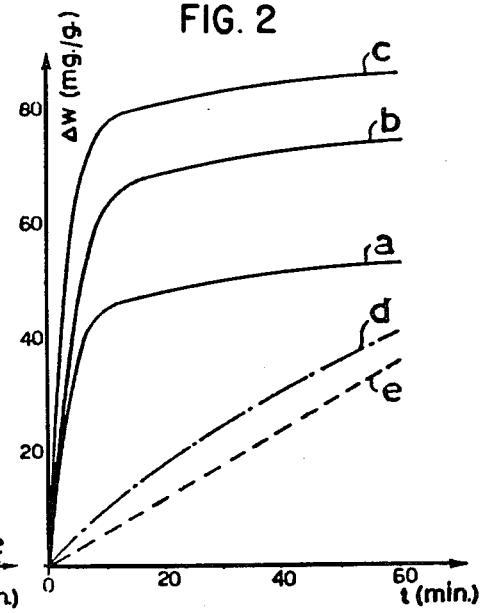
Figure 3:
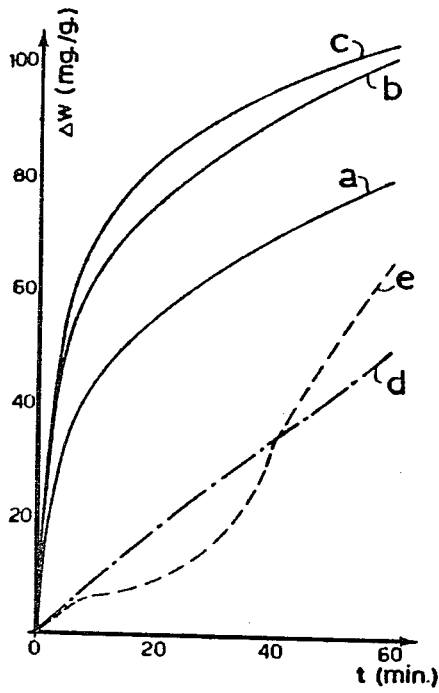
Figure 4:
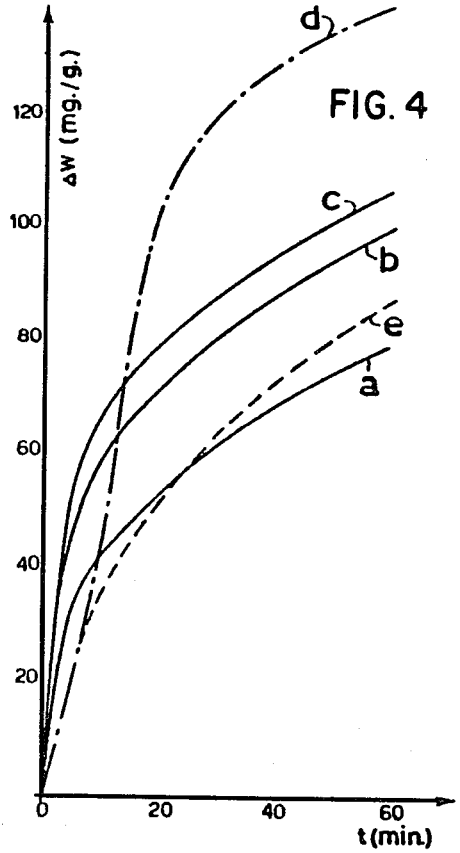
Figure 5:
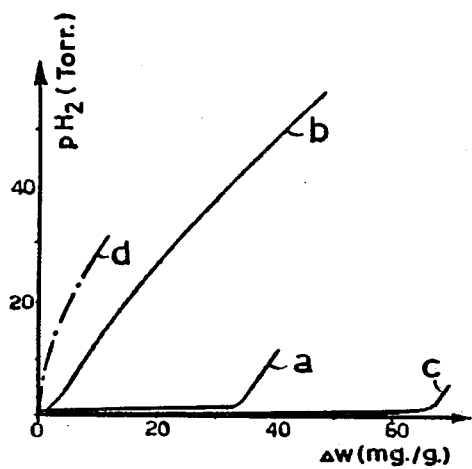
FIGS. 5 through 8 inclusive are graphs showing the increase in the partial pressure of hydrogen within the system as a function of the increase in weight of the gettering alloy.
Figure 6:
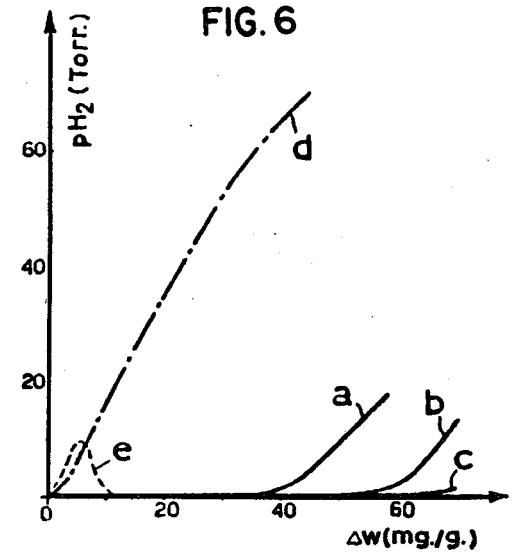
Figure 7:
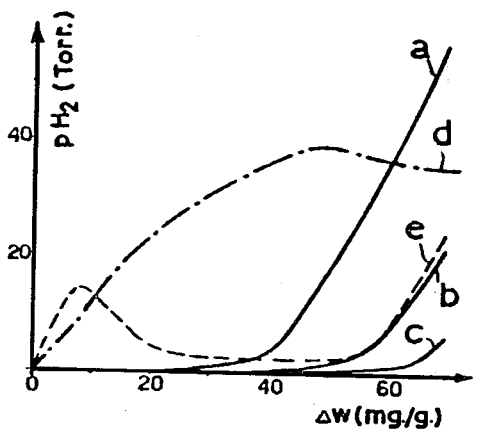
Figure 8:
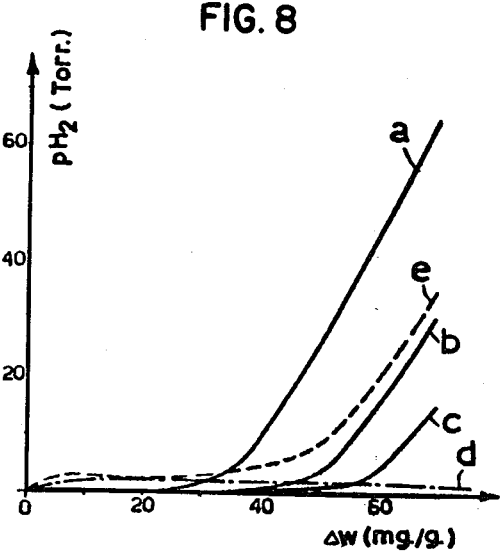
Figure 9:
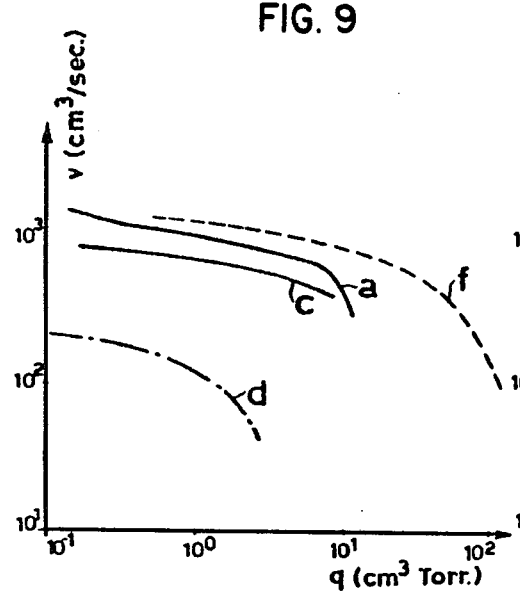
Figure 10:
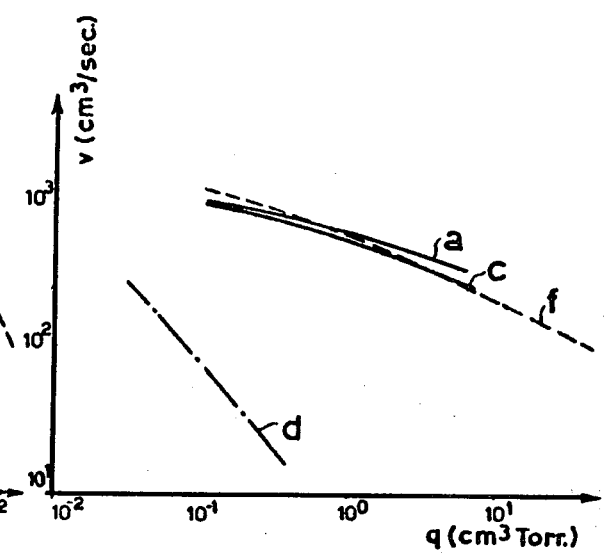

The variously compared gettering alloys have been used in the same way as described and illustrated in said U.S. Pat. No. 4,071,335 and for the measurement of the water sorption characteristics of the gettering materials there was used the apparatus described and illustrated in FIG. 2 of the said U.S.A. Patent.

During the measurements the water vapour pressure in the system was that at 0° C. that is 4.6 Torr approximately.

The water sorption properties of the compared alloys were examined at nominal temperatures of 200°, 250°, 300° and 350° C.

At each of these temperatures the following measurements were made on the various gettering alloys:

the increase in weight of the gettering alloy in milligrams per gram of alloy as a function of the time in minutes (see FIGS. 1 to 4);

the partial pressure of hydrogen in the system Torr as a function of the increase in weight of the gettering alloy per gram of alloy (see FIGS. 5 to 8).

It should be noted that in the graphs shown in FIGS. 1 to 8 the three ternary alloys according to the invention are indicated with letters a, b, c, alloy Zr-Ti-Ni is indicated with letter d and alloy $Zr_2Ni$ is indicated with letter e.

The graphs of FIGS. 1 to 4 show the sorption speed and capacity of the gettering alloy. From these graphs the superiority of the ternary alloys of the present invention is clearly seen with respect to the comparative alloys at the low temperatures less than 350° C. For example while at 200° C. the $Zr_2Ni$ alloy shows no sorption of water and that of the alloy Zr-Ti-Ni is extremely low, the Zr-V-Fe alloys not only show a high sorption speed but also their sorption capacity is very much greater.

Similar considerations are valid for the tests performed as temperatures of 250° and 300° C.

In the test performed at 350° C. it is seen that alloys a, b and c according to the invention still have a higher sorption speed than the comparative alloys d and e, while known alloy Zr-Ti-Ni (d) has a higher sorption capacity.

The graphs shown in FIGS. 5 to 8 (the measurements made leading to this graph were measured simultaneously with those leading to FIGS. 1 to 4) demonstrate the ability of the gettering alloy to retain hydrogen during the sorption of water or water vapour. In fact these graphs show the increase in the partial pressure of hydrogen within the system as a function of the increase in weight of the gettering alloy and that is the release of hydrogen as the alloy continues to sorb more water.

At the lower temperatures (200°, 250°, 300°) the ternary alloys of the invention release hydrogen only after having sorbed a certain quantity of water, while the known alloys release hydrogen very much before. It can be seen that in the graph of FIG. 5 (200° C.) there is no curve relating to the alloy $Zr_2Ni$ as this alloy at that temperature did not sorb water.

Even at the temperature of 350° C. (FIG. 8) the ternary alloys of the invention still show a better behaviour than the comparative alloys at least until they have reached a certain stage of sorption.

Up to this point there has been demonstrated therefore the superiority of the ternary alloys Zr-V-Fe according to the invention with respect to known gettering alloys, as far as concerns the ability to sorb water and water vapour at temperatures less than 350° C. without the release of hydrogen. As has been said this property is particularly important in the use of gettering alloys in nuclear reactors.

With reference to FIGS. 9 to 12 there will now be demonstrated the suitability of ternary gettering alloys of the invention when they are used as getters in a traditional way, that is after activation for short times at a relatively high temperature.

In the experimental tests the two ternary alloys, referenced above with letters a and c, according to the invention have been compared with two known alloys, with the alloy Zr-Ti-Ni (British Pat. No. 1,370,208), indicated with the letter d, and with a binary alloy Zr-Al (U.S. Pat. No. 3,203,901), indicated with the letter f.

Figure 11:
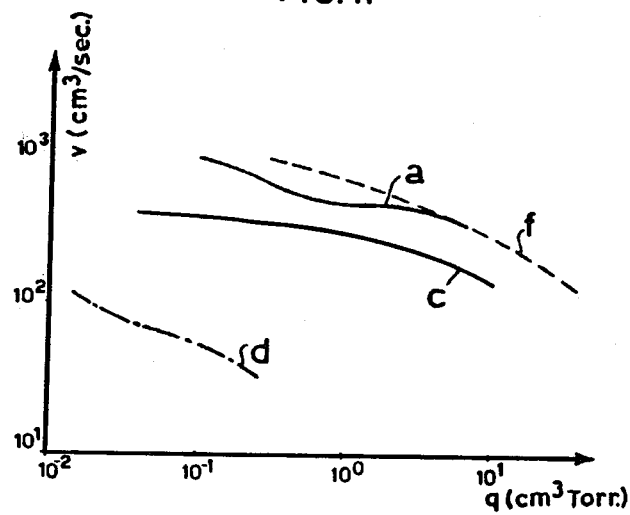

Before use all the gettering alloys were subjected to a thermal treatment for activation at a temperature of 900° C. for a time of 30 seconds, under vacuum at a pressure of $<10^{-3}$ torr. Measurements were made of the sorption speed V as a function of the quantity, q, of gas sorbed at a temperature of 400° C. (FIGS. 9 and 10) and at room temperature, 25° C. (FIGS. 11 and 12). The gases sorbed were respectively $H_2$ (FIGS. 9-11) and CO (FIGS. 10-12) at a pressure of $3.10^{-6}$ Torr.

The tests showed a behaviour of the ternary alloys of the invention significantly better with respect to the Zr-Ti-Ni alloy and substantially equal to that of the alloy 84% Zr-16% Al.

A further aspect of the ternary alloys of the invention is that they are activatable in a relatively short time of from 1 to 10 minutes at a relatively low temperature of from 350° to 450° C. for their successive use for the sorption at ambient temperatures of gases such as $H_2$ and CO.

Comparative tests have been made between ternary alloys referred to above with letters a and c and the ternary alloy Zr-Ti-Ni (indicated with letter d) in which the gettering alloys were activated at a temperature of 400° C. and then used at ambient temperature (25° C.) to sorb hydrogen and CO.

In one case the activation was carried out at 400° C. for 2 minutes and in another case the alloys were activated, still at the same temperature of 400° C., after having been left for one night at a temperature of 300°±50° C. to simulate degassing conditions used for various types of electron devices, as for example vacuum lamps and Dewars for infrared detectors, which conditions can already activate the getter.

In the first case the gettering alloys were therefore used for the sorption of hydrogen at a pressure of $3.10^{-5}$ Torr and the sorption curves are shown in the graph of FIG. 13. In the second case the gettering alloys were used for the sorption of hydrogen and CO at a pressure of $3.10^{-6}$ Torr and sorption curves are shown in the graphs of FIGS. 14 and 15 respectively. From these graphs it is evidently shown the superiority of the gettering alloys of the present invention.

From the above there can be clearly seen the advantages reached with the ternary gettering alloys of the invention and the wide range of possibilities of use of these alloys.

Generally speaking it has been seen that the method of the present invention for the stoichiometric sorption of oxygen and hydrogen for water and water vapour consists essentially of placing the water in contact with the ternary gettering alloy Zr-V-Fe, where the partial pressure of water is less than 100 Torr, where the gettering alloy has a temperature between 200° C. and 350° C., where the gettering alloy has a temperature between 200° and 350° C., where the gettering alloy is capable of sorbing up to 4 weight percent of water, and where the particle size of the gettering alloy is from 1µ to 500µ.

It should be born in mind that water and water vapour can be mixed with a rare gas, for example helium as is the case in nuclear fuel elements of a nuclear reactor.

On the other hand the method of the invention for the sorption of various gases such as for example $H_2$, CO, $CO_2$, from a closed vessel consists generally in the introduction into the vessel of a ternary gettering alloy of Zr-V-Fe, in the evacuation of the vessel to less than $10^{-2}$ Torr, in heating the ternary alloy at a temperature greater than 700° C. for a time greater than 20 seconds and in reducing then the temperature to a value between 400° C. and 25° C.

Although the invention has been described in detail with reference to certain preferred embodiments and applications it is intended that variations and modifications can be made within the spirit and scope of the invention as described and as defined in the following claims.

We claim:

1. A process for the sorption of gas from a closed vessel comprising the steps of:
(A) introducing into the vessel a non-evaporable ternary gettering alloy whose composition in weight percent when plotted on a ternary composition diagram in weight percent Zr, weight percent V and weight percent Fe lies within a polygon having as its corners the points defined by:
a—75% Zr - 20% V - 5% Fe
b—45% Zr - 20% V - 35% Fe
c—45% Zr - 50% V - 5% Fe
(B) evacuating the vessel to a pressure of less than $10^{-2}$ torr
(C) activating the gettering alloy by heating the ternary alloy to a temperature of greater than 700° C. and,
(D) reducing the temperature to a value between 400° C. and 25° C.

2. A process of claim 1 in which the ternary alloy composition lies within a polygon having as its corners the points defined by:
(d) 70% Zr - 25% V - 5% Fe
(e) 70% Zr - 24% V - 6% Fe
(f) 66% Zr - 24% V - 10% Fe
(g) 47% Zr - 43% V - 10% Fe
(h) 47% Zr - 45% V - 8% Fe
(i) 50% Zr - 45% V - 5% Fe.

3. A process for the sorption of gas from a closed vessel comprising the step of:
(A) introducing into the vessel a non-evaporable ternary gettering alloy whose composition in weight percent when plotted on a ternary composition diagram in weight percent Zr, weight percent V and weight percent Fe lies within a polygon having as its corners the points defined by:
a—75% Zr - 20% V - 5% Fe
b—45% Zr - 20% V - 35% Fe
c—45% Zr - 50% V - 5% Fe
(B) evacuating the vessel to a pressure of less than $10^{-2}$ torr
(C) activating the gettering alloy by heating the ternary alloy to a temperature of not greater than 450° C. for a time of between 1 to 10 minutes and
(D) reducing the temperature to a value between 400° C. and 25° C.

4. A process of claim 3 in which:
introducing into the vessel a non-evaporable ternary gettering alloy whose composition in weight percent when plotted on a ternary composition diagram in weight percent Zr, weight percent V and weight percent Fe lies within a polygon having as its corners the points defined by
(d) 70% Zr - 25% V - 5% Fe
(e) 70% Zr - 24% V - 6% Fe
(f) 66% Zr - 24% V - 10% Fe
(g) 47% Zr - 43% V - 10% Fe
(h) 47% Zr - 45% V - 8% Fe
(i) 50% Zr - 45% V - 5% Fe.

5. A process for sorbing both oxygen and hydrogen from water comprising contacting the water with a non-evaporable getter metal consisting essentially of a ternary alloy whose composition in weight percent when plotted on a ternary composition diagram in weight percent Zr, weight percent V and weight percent Fe lies within a polygon having as its corners the points defined by:
a—75% Zr - 20% V - 5% Fe
b—45% Zr - 20% V - 35% Fe
c—45% Zr - 50% V - 5% Fe.

6. A process for sorbing both oxygen and hydrogen from water comprising contacting the water with a non-evaporable getter metal consisting essentially of a ternary alloy whose composition in weight percent when plotted on a ternary composition diagram in weight percent Zr, weight percent V and weight percent Fe lies within a polygon having as its corners the points defined by:
(d) 70% Zr - 25% V - 5% Fe
(e) 70% Zr - 24% V - 6% Fe
(f) 66% Zr - 24% V - 10% Fe
(g) 47% Zr - 43% V - 10% Fe
(h) 47% Zr - 45% V -8% Fe
(i) 50% Zr - 45% V - 5% Fe.

7. A process of claim 5 in which the getter metal is heated to a temperature of between 250° C. and 350° C.

8. A process of any of claims 1 to 7 in which the gettering alloy is particulate and has a particle size of less than 500µ.

* * * * *

REEXAMINATION CERTIFICATE (1678th)
United States Patent [19]
Boffito et al.

[11] B1 4,312,669
[45] Certificate Issued Apr. 14, 1992

[54] NON-EVAPORABLE TERNARY GETTERING ALLOY AND METHOD OF USE FOR THE SORPTION OF WATER, WATER VAPOR AND OTHER GASES

[75] Inventors: Claudio Boffito; Aldo Barosi; Alessandro Figini, all of Milan, Italy

[73] Assignee: S.A.E.S. Getters S.P.A., Italy

Reexamination Request:
No. 90/002,169, Oct. 16, 1990
No. 90/002,198, Nov. 13, 1990

Reexamination Certificate for:
Patent No.: 4,312,669
Issued: Jan. 26, 1982
Appl. No.: 115,051
Filed: Jan. 24, 1980

[30] Foreign Application Priority Data

Feb. 5, 1979 [IT] Italy .................. 19901 A/79

[51] Int. Cl.$^5$ .................................. C22C 16/00
[52] U.S. Cl. .................. 420/422; 55/33; 376/418; 420/900; 423/644
[58] Field of Search .......... 420/90, 422; 376/418; 55/33; 423/644

[56] References Cited

U.S. PATENT DOCUMENTS

2,895,368 10/1958 Perdijk et al. ............... 252/181.6
3,762,995 10/1973 Gulbransen et al. ............ 176/68

OTHER PUBLICATIONS

P. della Porta et al., "Investigations Concerning Bulk Getters from Metals of the IV A Group and Thorium", *Pergamon Press*, Transactions of the Eighth National Vacuum Symposium 1 (1961), pp. 229–238.
T. Giorgi, "Getters and Gettering", Proceedings of the 6th International Vacuum Congress, printed in *Japanese Journal of Applied Physics*, Suppl. 2, Part 1, (1974), pp. 53–60.
M. H. Mendelsohn et al., "Intermetallic Compounds as Bulk Getters", *Journal of the Less-Common Metals*, 74 (1980), pp. 449–453.
Pebler and Gulbransen, "Thermochemical and Structural Aspects of the Reaction of Hydrogen with Alloys and Intermetallic Compounds of Zirconium", *Electrochemical Technology*, vol. 4, Nos. 5–6 (1966), pp. 211–215.
Pebler and Gulbransen, "Equilibrium Studies on the Systems $ZrCr_2-H_2$, $ZrV_2-H_2$, and $ZrMo_2-H_2$ Between 0° and 900° C.", *Transactions of the Metallurgical Society of AIME*, vol. 239 (1967), pp. 1593–1600.
Barosi et al., "A Non-Evaporable Getter for Low Temperatures", *Pergamon Press Ltd.*, vol. 23, No. 1 (1972), pp. 15–19.
W. H. Kohl, *Handbook of Materials and Techniques for Vacuum Devices*, Reinhold Publishing Corp., New York, 1967, pp. 545–562.
Duffer et al, Phys. Stat. Solidi 31(e), 1975, p. 655.
Kanematsu et al, Jour. Phys. Soc., Japan, 29 (Oct. 1970), 864.

*Primary Examiner*—Upendra Roy

[57] ABSTRACT

A non-evaporable getter alloy is provided which can be used in a process for the sorption of gas from a closed vessel comprising the step of:
introducing into the vessel a non-evaporable ternary gettering alloy whose composition in weight percent when plotted on a ternary composition diagram in weight percent Zr, weight percent V and weight percent Fe lies with a polygon having as its corners the points defined by:
(a) 75% Zr-20% V-5% Fe
(b) 45% Zr-20% V-35% Fe
(c) 45% Zr-50% V-5% Fe such alloys can sorb water vapor without the release of $H_2$ between 200°–350° C. and can be used in a wide temperature range for the sorption of other gases. They can also be activated in short times at relatively low temperatures, to be used as a getter at room temperature.

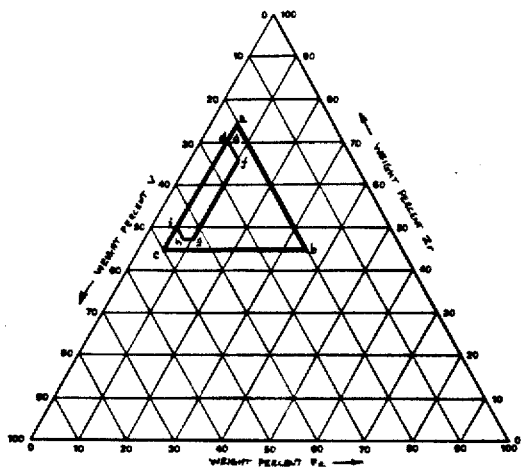

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-8 is confirmed.

* * * * *